US006771249B1

(12) United States Patent
Hush et al.

(10) Patent No.: US 6,771,249 B1
(45) Date of Patent: *Aug. 3, 2004

(54) PRODUCING WALKING ONE PATTERN IN SHIFT REGISTER

(75) Inventors: Glen Hush, Boise, ID (US); Jake Baker, Meridian, ID (US); Tom Voshell, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/042,736

(22) Filed: Jun. 1, 1999

Related U.S. Application Data

(63) Continuation of application No. 08/865,507, filed on May 30, 1997, now Pat. No. 5,909,201, which is a continuation of application No. 08/372,413, filed on Jan. 13, 1995, now Pat. No. 5,638,085.

(51) Int. Cl.[7] .......... C09G 3/36

(52) U.S. Cl. .......... 345/100; 377/72

(58) Field of Search .......... 345/100, 599; 377/72, 73

(56) References Cited

U.S. PATENT DOCUMENTS

| | | | | | |
|---|---|---|---|---|---|
| 4,901,076 | A | | 2/1990 | Askin et al. | |
| 5,598,156 | A | | 1/1997 | Hush et al. | |
| 5,638,085 | A | * | 6/1997 | Hush et al. | 345/75.2 |
| 5,818,365 | A | | 10/1998 | Hush et al. | |
| 5,909,201 | A | * | 6/1999 | Hush et al. | 345/74.1 |

* cited by examiner

*Primary Examiner*—Bipin Shalwala
*Assistant Examiner*—Ricardo Osorio
(74) *Attorney, Agent, or Firm*—William R. Banchand; Robert J. Stern

(57) ABSTRACT

A circuit and method for producing a walking one pattern in a shift register. The circuit comprises a shift register and a NOR gate. The NOR gate output is connected to the data input of the shift register, and the data output of each of said register stages is connected to a respective one of the NOR gate inputs.

6 Claims, 7 Drawing Sheets

PRODUCING WALKING ONE PATTERN IN SHIFT REGISTER

This application is a continuation of application Ser. No. 08/865,507 filed May 30, 1997, now U.S. Pat. No. 5,909,201, which is a continuation of application Ser. No. 08/372,413 filed Jan. 13, 1995, now U.S. Pat. No. 5,638,085.

This invention was made with Government support under Contract No. DABT63-93-C-0025 awarded by Advanced Research Projects Agency (ARPA). The Government has certain rights in this invention.

FIELD OF THE INVENTION

This invention relates to displays and to systems for maintaining synchronization in displays.

BACKGROUND OF THE INVENTION

As an introduction to the problems solved by the present invention, consider the conventional flat panel matrix display having a row-column array of picture elements (pixels), each pixel at the intersection of a row and a column. Display in such pixels is conventionally accomplished by a display cell matrix aligned with the pixel matrix so that each display cell is addressed as a member of one row and one column. In an active matrix display, where each display cell includes at least one switch, each display cell is addressed for enabling display when it receives a column pointer signal and a row pointer signal. Many thousands of such pointer signals are needed to address a moderate size matrix of, for example, one million pixels arranged in one thousand rows and one thousand columns. Without integrated circuit packaging techniques, reliable displays having so many interconnections are not economically feasible.

One type of matrix display includes the field emission display wherein the matrix of display cells, circuits for generating the column and row pointer signals, and all the interconnecting conductors are formed on an integrated circuit substrate. Although it would be highly desirable to form video signal processing circuits on the same substrate, further integration of such support circuitry on the substrate has been frustrated by the excessive amount of substrate surface area occupied by conventional addressing circuits, and the excessive power consumed by such circuits.

Conventional video signals are sophisticated, requiring considerable circuitry for deriving color and intensity information for each pixel. In the conventional video signal, row and column addressing information must be derived from the video signal by synchronizing higher frequency clock signals with the video signal, by counting pulses, by detecting pulse frequency, and by detecting pulse duty cycle. Using conventional circuitry, these functions cannot be economically formed on the integrated circuit substrate with other display circuitry because conventional circuitry requires considerable substrate surface area, consumes excessive power, and is so complex that overall reliability goals cannot be economically met.

Without economical integrated circuit displays, systems designs will be limited to use of bulky, unreliable cathode ray tube displays, slow, dim liquid crystal displays, and expensive electroluminescent displays. Such limitations on systems designs will effectively prohibit introduction of new, portable, long life, reliable, and sophisticated industrial and consumer products in wide ranging fields including, for example, such fields as instrumentation, communications, entertainment, photography, and information processing.

In view of the problems described above and related problems that consequently become apparent to those skilled in the applicable arts, the need remains in matrix display products for improved matrix displays and methods for synchronizing such displays with an input signal.

SUMMARY OF THE INVENTION

The present invention is a circuit and method for producing a walking one pattern in a shift register. The circuit comprises a shift register and a NOR gate. The NOR gate output is connected to the data input of the shift register, and the data output of each of said shift register stages is connected to a respective one of the NOR gate inputs.

The invention is particularly useful in an electro-optic display having a matix of display cells arranged in rows and columns. The output of each stage of the shift register preferably is associated with one column of the display and controls a transfer gate circuit, which can be a single transistor, so as to couple the video signal to that column of display cells when the output of that shift register stage is a logical one.

Accordingly, a display in one embodiment of the present invention is responsive to an input signal. The input signal includes a recurring pulse, a first value at a first time, and a second value at a second time. The second time being after the first time by a predetermined duration. The display includes a first pixel, a second pixel, and a shift circuit. The shift circuit determines the predetermined duration by synchronizing display operation with the recurring pulse. The shift circuit also identifies the first pixel for displaying responsive to the first value and identifies the second pixel for displaying responsive to the second value.

According to a first aspect of such an embodiment, the shift circuit performs multiple functions. By performing multiple functions, several benefits inure including: over all display circuit complexity is reduced, less surface area on the integrated circuit substrate is used for addressing and video signal processing functions, reliability and manufacturing yields are improved, and power and heat consumption are reduced.

A field emission display, according to another embodiment of the present invention, receives a synchronizing signal and includes: a target and an integrated circuit. The integrated circuit includes a grid, a field emission tip, and a phase locked loop. The target, located adjacent to the integrated circuit, includes a phosphorescent substance. The grid defines a matrix of pixels on the target. The field emission tip responds to a pointer signal for displaying by emission from the tip through the grid and toward a pixel of the matrix, enabling the pixel to phosphoresce. The phase locked loop includes an oscillator, a shift circuit, and a comparator. The oscillator provides a clock signal at a period responsive to an error signal. The shift circuit shifts in response to the clock signal, and provides the pointer signal and an overflow signal. The comparator provides the error signal by comparing in response to the synchronizing signal and the overflow signal.

According to an aspect of such an embodiment of the present invention, the shifting circuit provides both the overflow signal for synchronization of the phase locked loop and the pointer signal for enabling phosphorescence in the addressed pixel. The need for additional synchronizing circuitry, such as a counter for dividing the oscillator signal period, is eliminated with benefits as already recited above.

The present invention may be practiced according to a method in one embodiment for maintaining synchronization in a display, the display being responsive to a video signal that includes a first, a second, and a third plurality of periods.

Each period of the first, the second, and the third plurality is characterized by a duration. The video signal during each period of the first plurality is characterized by a respective pulse and a respective value. Each respective value during each period of the first plurality is within a range of magnitudes. The second plurality of periods follows after the first plurality of periods. The video signal during each period of the second plurality is characterized by a respective pulse and a respective value. Each respective value during each period of the second plurality is characterized by a first magnitude outside the range. The third plurality of periods follows after the second plurality of periods. The video signal during each period of the third plurality is characterized by a respective pulse and a respective value. Each respective value during each period of the third plurality is a second magnitude outside the range.

The method includes the steps of (1) determining for each period a first respective time when the respective pulse is expected to begin and identifying a second respective time; (2) determining a third time when the second plurality of periods is expected to begin; (3) establishing the start time; and (4) repeating the three foregoing steps, thereby maintaining synchronization.

According to a first aspect of such a method, by detecting the respective value in each period, vertical synchronization is reliably achieved. Circuitry for performing such a method is simpler, uses less substrate surface area, and consumes less power.

A frame buffer includes a timing control for scanning a matrixed array in yet another embodiment of the present invention. The frame buffer is similar to the display embodiments, except a matrix of memory cells is employed in place of the matrix of display cells. Each memory cell stores samples taken from the input signal at a predetermined time after a recurring synchronization signal is received. The timing control includes means for reading the memory cells and means for outputting values read from memory.

According to a first aspect of such a frame buffer, by decreasing the size and complexity of the frame buffer as in the present invention over conventional frame buffers, a larger number of samples are stored in one semiconductor frame buffer circuit. Such a frame buffer finds application in video, communication, and measurement systems wherein each frame comprises an increased amount of data, for example, for a larger frame or for increased resolution and accuracy.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

A person having ordinary skill in the art will recognize where portions of a diagram have been expanded to improve the clarity of the presentation.

In each functional block diagram, a group of signals having no binary coded relationship is shown as a single line with an arrow. A single line between functional blocks represents one or more signals.

Signals that appear on several figures and have the same mnemonic are coupled together by direct connection or by additional devices. A signal named with a mnemonic and a second signal named with the same mnemonic followed by an asterisk are related by logic inversion.

In each timing diagram the vertical axis represents binary logic levels, or analog voltage, and the horizontal axis represents time. The vertical axis is intended to show the transition from active (asserted) to passive (non-asserted) levels of each logic signal. The voltages corresponding to the logic levels of the various signals are not necessarily identical among the various signals.

Detailed Description of the Invention

Figure 1:
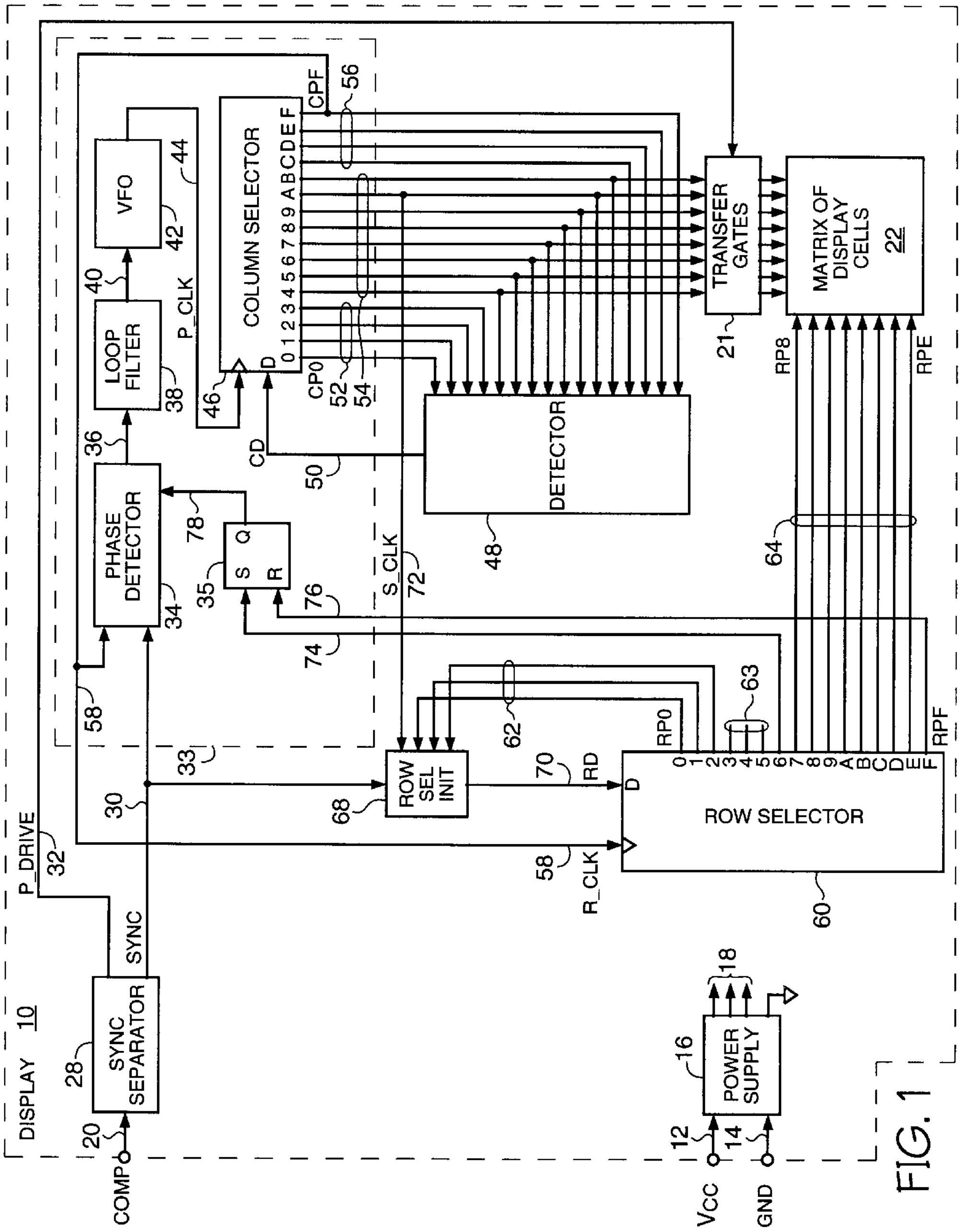
FIG. 1 is a functional block diagram of a display of the present invention.

FIG. 1 is a functional block diagram of a display of the present invention. Display 10 in a preferred embodiment is a flat panel matrix display that includes all circuitry formed on an integrated circuit substrate. Such circuitry includes power supply circuit 16, sync separator circuit 28, phase locked loop 33, transfer gates 21, row selector 60, row selector initialization logic 68, and matrix of display cells 22. The phase locked loop includes phase comparator 34, loop filter 38, variable frequency oscillator 42, column selector 46, and flip flop 35. Embodiments of display 10 vary as to the structure of a display cell in matrix 22. In various embodiments, each display cell includes a light emitting diode, a liquid crystal shutter, an electroluminescent device, and equivalent conventional display cell devices. In a preferred embodiment, each display cell includes a tip for field emission toward a phosphorescent target to be discussed with reference to FIG. 6.

Display 10 receives composite signal COMP on line 20, power signal $V_{cc}$ on line 12, and ground reference potential signal GND on line 14. Composite signals conventionally include a synchronizing signal, conventionally called a "sync" signal, and, for each pixel of the matrix display, an analog drive signal. Display 10 separates signal COMP into synchronizing signal SYNC on line 30 and analog drive signal P_DATA on line 32, then scans matrix 22 in synchronism with the composite signal so that a conventional television picture is displayed.

Each picture conventionally includes a top row corresponding to the top horizontal edge of the display, a bottom row corresponding to the bottom horizontal edge of the display and numerous rows in between, for example 998 intermediate rows. Each row conventionally includes many columns, for example 1000. Since signal COMP on line 20 conventionally conveys information regarding only one pixel at any instant in time, a predetermined scanning order is understood wherein, for example, pixels for the picture are described in left to right column order and in top to bottom row order. Pictures are conveyed one after another for rapid flicker free display. Thus, synchronization is maintained in order to assure, for example, that the display cell corresponding to the top left pixel of matrix 22 is responsive exclusively to information conveyed by signal COMP on line 20 regarding the top left pixel of the picture to be displayed. Conventionally, the concept of synchronization includes horizontal synchronization, i.e. determining the first column of each row; and vertical synchronization, i.e. determining the top row to be displayed.

Power supply 16, formed on the substrate, receives direct current via signals $V_{cc}$ and GND on lines 12 and 14 and provides, using conventional circuit techniques, several regulated and current limited DC voltages on lines 18 of various potentials as needed for use by circuits of display 10.

Sync separator 28 is formed on the substrate using conventional analog and digital circuitry. Sync separator 28 receives composite signal COMP on line 20 and provides signal SYNC on line 30 without analog drive information, and signal P_DRIVE on line 32 without synchronization information. Composite signal COMP on line 20 includes a synchronizing signal during periods T1 to T2 and T7 to T8 shown in FIG. 2 as a maximum amplitude V4 and a bandwidth greater than the bandwidth of the composite signal during periods T3 to T7. Sync separator 28 detects the synchronizing signal using conventional techniques used to detect and separate signals, such as edge detection, threshold detection, switching, filtering, and delay techniques.

Sync separator 28 supports a monochrome display. For a monochrome display, the brightness, intensity, and contrast of each pixel is determined at least in part by signal P_DRIVE. In alternate monochrome embodiments conventional background illumination and conventional control signals for average brightness of the entire display cooperate with signal P_drive.

For a color display, a color sync separator with RGB decoder is used in place of sync separator 28. The color sync separator with RGB decoder receives a composite signal and provides a sync signal without analog drive information, and provides a group of pixel drive signals without synchronization information. The group of pixel drive signals includes pixel drive for red, green, and blue (RGB) constituents of a color pixel.

A display in an alternate embodiment of the present invention receives signals P_drive and SYNC on separate conductors; sync separation being accomplished by circuitry external to the display.

Phase locked loop 33 receives signal SYNC on line 30 and provides row clock signal R_CLK on line 58 and sampling signal S_CLK on line 72. See FIG. 2. Pixel clock signal P_CLK appears on line 44 at the output of variable frequency oscillator (VFO) 42. Column selector 46 provides a delay so that the loop locks on a period T1 to T9 of signal SYNC shown in FIG. 2 while VFO 42 operates at a shorter period as shown by duration D1 in FIG. 2. Phase detector 34, loop filter 38, and VFO 42 employ conventional circuits known in the art.

In operation, phase comparator 34 responds to a difference in the phase of signals on lines 30 and 58 by outputting an error signal on line 36 at least in part proportional to the extent of the phase difference. Loop filter 38 in a preferred embodiment includes a low-pass filter to remove high frequency components from the error signal and to provide a band-limited frequency control signal on line 40. VFO 42 responds to the frequency control signal by adjusting its operating oscillator frequency and, hence, the period D1 of signal P_CLK on line 44. By filtering the error signal, loop filter 38 prevents erratic frequency changes by VFO 42.

Figure 2:
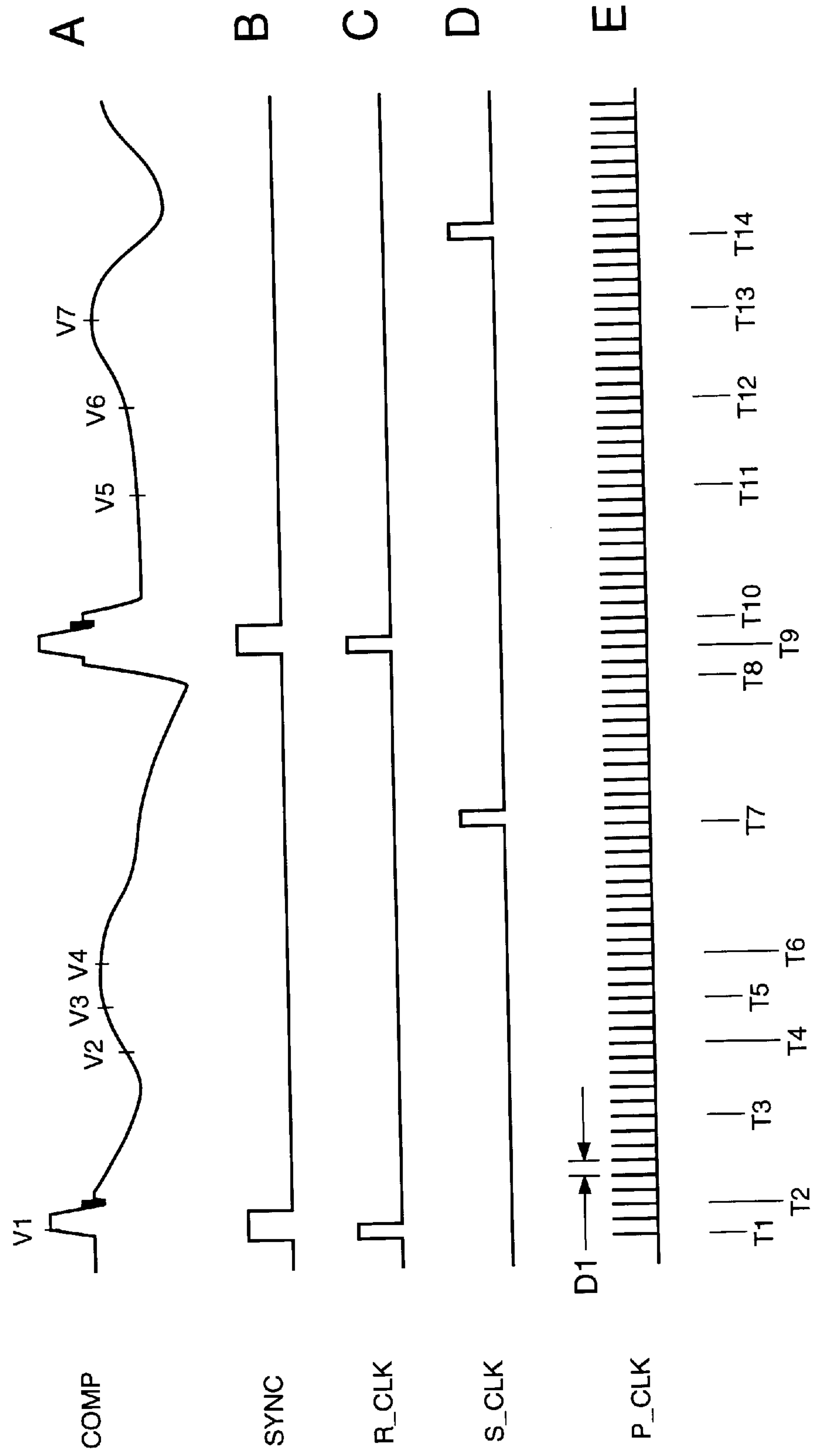
FIG. 2 is a timing diagram of signals shown in FIG. 1 including a first portion of signal COMP on line 20.
Figure 4:
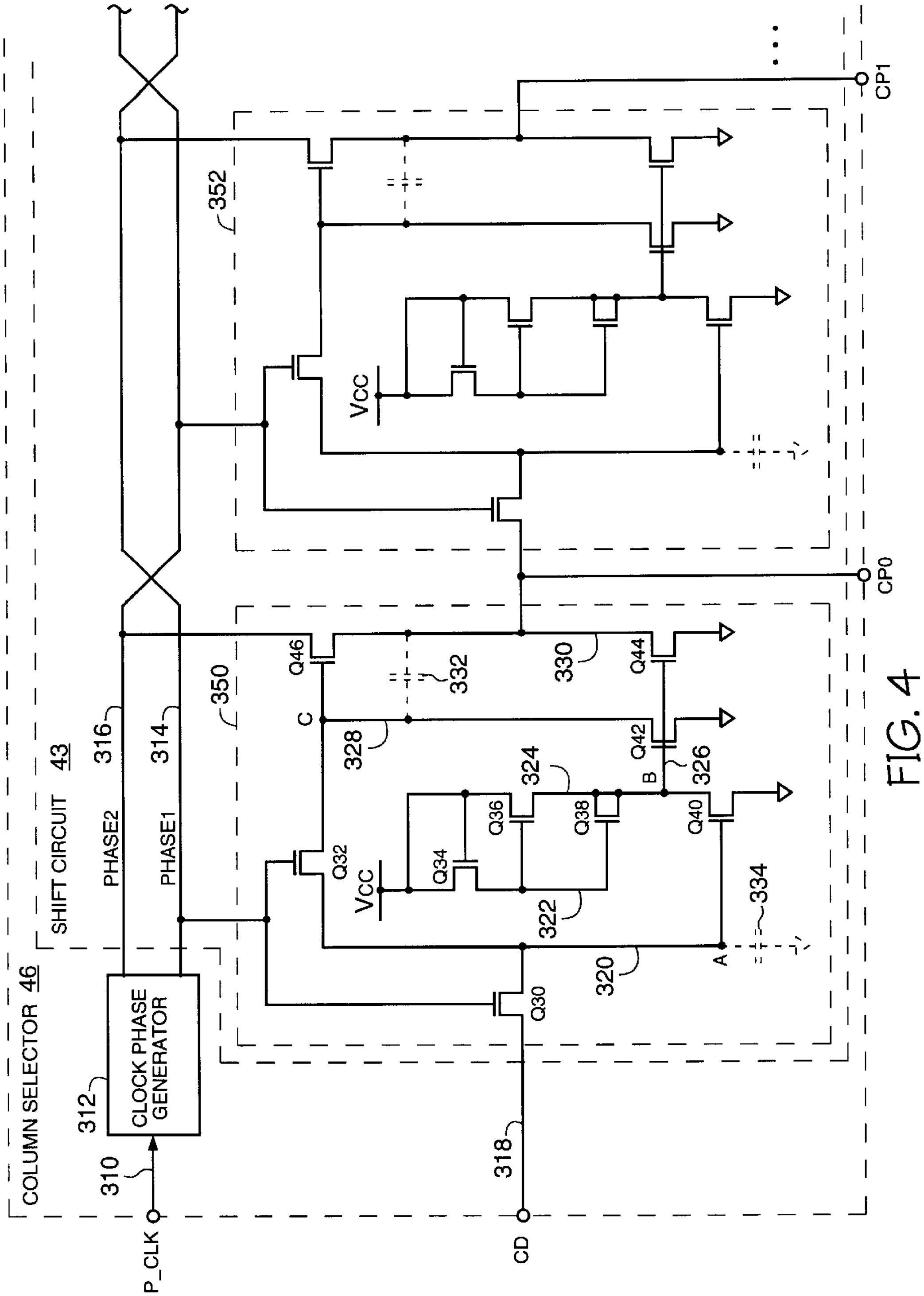
FIG. 4 is a schematic diagram of a portion of the column selector shown in FIG. 1.

Column selector 46 principally includes a shift circuit 43, shown in detail in FIG. 4. Shift circuit 43 shifts a pattern of "high" and "low" states in response to signal P_CLK and provides column pointer signals CP0 through CPF. To simplify description, shift circuit 43 includes 16 shift stages, though, for example, more than 1000 shift stages would ordinarily be used. In alternate and equivalent embodiments, fewer or more shift stages are used to provide a delay consistent with the duration between recurring periods T1 to T9 and the number of analog amplitudes to be sampled for pixel drive during period T3 to T8 as shown in FIG. 2.

On initial or subsequent receipt of operating power on lines 12 and 14, the collective state of these shift stages will included a random population in the "high" state and the remainder in the "low" state. These stages are connected in series from a first shift bit position coupled to output CP0 to a last shift bit position coupled to output CPF so that, for every period of signal P_CLK on line 44, the pattern of "high" and "low" states shifts to the right one shift bit position. Signal CPF, provided on line 58 at the last shift bit position, constitutes an overflow signal from shift circuit 43 and indicates, when "high," that a walking-one pattern has been shifted 15 times from the time the pattern was established.

Column selector 46 provides column pointer signals CP0 through CPF on three groups of lines 52, 54, and 56. Column pointer signals on lines in group 54 are connected to transfer gates 21 for controlling sampling and for directing access to display cells in matrix 22, each identifying one column. Signals in groups 52 and 56 are connected to detector 48 for maintaining the walking-one pattern. By reserving a number of column pointer lines at the beginning and at the end of period T1 to T9 shown in FIG. 2, accuracy of sampling is improved because transfer gates 21 have time to settle or otherwise prepare for receipt of analog signals during period T1 to T8. In an alternate and equivalent embodiment of display 10, signal COMP on line 20 includes one or more additional periods during which pixel drive information is not conveyed. The length of such additional periods can be compensated for by selecting an appropriate number of lines for groups 52 and 56 as will be apparent to one of ordinary skill.

The pointer signal coupled from column selector 46 to transfer gates 21 in the illustrated embodiment includes signals on 8 lines for identifying 8 samples per period T3 to T8. Also, signal group 54 is preceded and followed by shift bit positions not coupled to transfer gates 21. In alternate and equivalent embodiments the number and time occurrence of signals to be sampled during period T3 to T8 varies with system design. In other equivalent embodiments, the pointer signal is conveyed on one or more lines with one or more logic levels being associated with each pointer value. Also, the number of preceding and following shift bit positions (if any) that are not coupled to a transfer gate is, in alternate and equivalent embodiments, any number including zero.

For example, in another embodiment, drive values for 1000 pixels immediately follow time T3 and an additional period having a duration equivalent to 3000 samples stands between the last sample, say at time T6, and the next occurrence of the sync pulse at time T9. A shift circuit in such an embodiment includes 1000 shift stages and provides pointer signals CP0 through CP999 coupled to transfer gates in a manner similar to that shown in FIG. 1. In place of 3000 additional shift stages, a counter, started by the overflow signal CP999, counts the remaining 3000 periods of the clock signal until the next synchronizing signal is expected to occur. In such an embodiment, a conventional counter circuit is used to generate a carry signal used by detector circuitry, as would be appreciated by one of ordinary skill in the art in view of the detector functions described below.

In the embodiment shown in FIG. 1, detector 48 establishes and maintains a walking-one pattern in column selector 46 using conventional logic circuitry. For establishing and maintaining a walking-one pattern, in one embodiment, detector 48 includes a 16 input NOR gate for providing an output "low" signal CD on line 50 when any input pointer signal PO through PF is "high." Only when all pointer signals are "low" will the gate provide a "high" signal CD on line 50. In operation, "low" signals are clocked into shift circuit 43 and shifted toward shift bit position PF until all shift stages of shift circuit 43 are "low." Then, one "high" signal is clocked into the first shift bit position; after which the walking-one pattern has been established and will be so maintained.

Equivalent variations in terminology may aid understanding. For example, when a signal is said to be clocked into a storage element such as a shift stage, one of ordinary skill would recognize that a bit is said to be loaded into a shift bit position. Further, a sequence of bits in a sequence of bit positions form a pattern without regard to physical layout or signal polarity.

Row selector 60 principally includes a second shift circuit, herein called the row shift circuit, identical in construction and operation to that shown in detail as shift circuit 43 in FIG. 4. The row shift circuit shifts a pattern of "high" and "low" states in response to signal R_CLK and provides row pointer signals RP0 through RPF. To simplify description, the row shift circuit includes 16 shift stages, though, for example, more than 1000 stages would ordinarily be used. In alternate and equivalent embodiments, fewer or more stages are used to provide for the number of rows in matrix 22.

Row selector 60 provides shift signals RP0 through RPF on three groups of lines 62, 63, and 64. Row pointer signals on lines in group 64 are connected to matrix 22 for directing access to display cells in matrix 22, each identifying one row. Signals in group 62 are connected to detector 68 for establishing and maintaining vertical synchronization. The number of shift bit positions in groups 62 and 63 account for the duration between times T23 and T31 shown in FIG. 3 so that the walking-one pattern asserts pointer signal RP8 when the top row of the display is conveyed by P_DRIVE signal 32. In an alternate and equivalent embodiment of display 10, signal COMP on line 20 includes one or more additional periods during which pixel drive information is not conveyed. The length of such additional periods can be compensated for by selecting an appropriate number of lines for group 63 as will be apparent to one of ordinary skill.

Row selector initialization logic 68, formed on the substrate using conventional circuitry, establishes and maintains vertical synchronization by receiving outputs from column selector 46, outputs from row selector 60, and signal SYNC on line 30 to provide signal RD on line 70. Operation is best understood with reference to a particular embodiment shown in FIG. 7 and timing diagrams in FIGS. 2 and 3, to be discussed.

FIG. 2 is a timing diagram of signals shown in FIG. 1 including a first portion of signal COMP on line 20. Signal COMP conveys a synchronizing amplitude V1 from time T1 to time T2 and pixel drive amplitudes from time T3 to Time T8. Pixel drive amplitudes are permissible within a range of amplitudes not including the amplitude V1. In addition, successive pixel drive amplitudes are limited to prevent out of band frequency components. The relative magnitude of amplitude V1 and the rise and fall times to and from amplitude V1 are detectable for obtaining horizontal synchronization signal SYNC on line 30 as already described. Signal SYNC recurs at a period from T1 to T9 between sync pulses from time T1 to time T2 and from time T9 to time T10. Signal R_CLK, recurring at times T1 and T9 on line 58, and signal S_CLK, recurring at times T7 and T14 on line 72, are asserted for a duration equal to the duration D1 of the period of signal P_CLK. Signal P_CLK is provided on line 44 by VFO 42. The duration of assertion of each signal R_CLK and P_CLK is characteristically short because each signal is produced by a shift stage output of one shift bit position in the first shift circuit.

The drive signal values for individual pixels in the sequence of frames in a television picture are conveyed by signal COMP as analog voltages, for example, V2 through V7. In one embodiment, signal COMP conforms to a standard television picture signal of the type described in "NTSC Signal Specifications," Proceedings of the IRE pages 17 through 19, January 1954 and in "The NTSC Color Television Standards," Proceedings of the IRE pages 46 through 48, January 1954, both incorporated herein by reference. Accordingly, amplitudes V2 through V4, for example, convey brightness for pixels in a first row, scanned in left to right order i.e. in order of increasing column numbers. Subsequently, amplitudes V5 through V7 convey brightness for pixels in a second row. The person of ordinary skill will recognize that in alternate and equivalent embodiments wherein conformity to NTSC standards is not required, the sequence of addressing pixels in matrix 22 varies the from column by column, left to right, row by row, top to bottom, color by color, and frame by frame addressing sequence of the illustrated embodiment.

Figure 3:
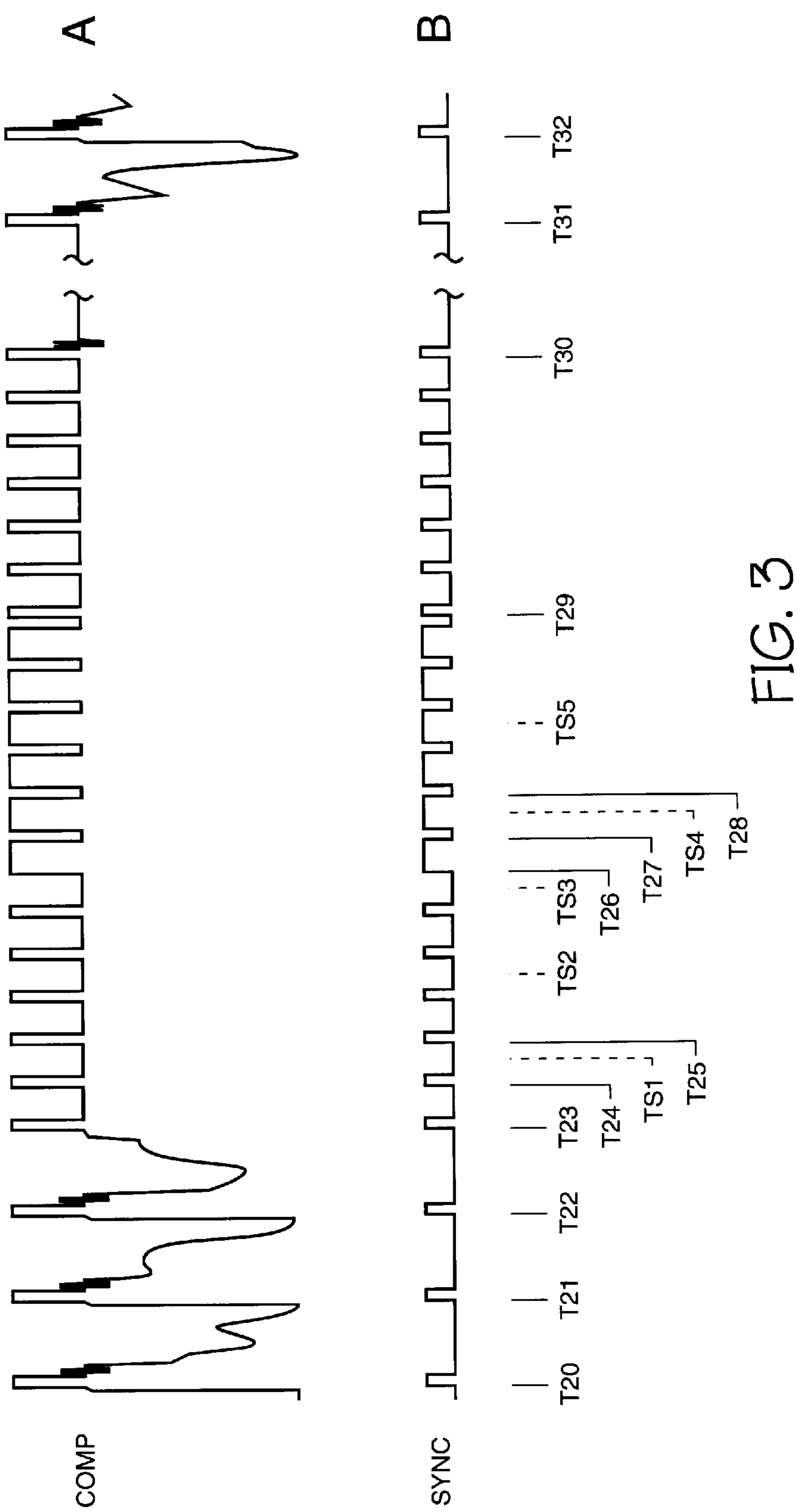
FIG. 3 is a timing diagram of a second portion of a signal COMP on line 20 shown in FIG. 1.

FIG. 3 is a timing diagram of a second portion of signal COMP on line 20 shown in FIG. 1. At times T20 through T22, the final three rows of matrix 22, corresponding to the bottom three rows of display 10, are conveyed by recurring periods of signal COMP similar to those shown in FIG. 2. Similarly, at times T31 and T32, the initial two rows of matrix 22 corresponding to the top two rows of display 10 are conveyed. In an alternate and equivalent embodiment having interlaced rows, times T20 through T22 correspond to the bottom rows in a frame and times T31 and T32 correspond to the top rows in the following frame. Between times T23 and T31, signal COMP conveys signals from which vertical synchronization can be attained.

In one embodiment, signal COMP conforms to a standard television picture signal of the type described in the articles cited above. In an NTSC signal format, vertical synchronization is conveyed by four special periods. In a first period from time T23 to T26 and a third period from time T29 to time T30, a train of pulses at twice the pulse rate of the horizontal synchronization signal occurs. In a second period from time T26 to time T29, a train of inverted pulses at twice the pulse rate of the horizontal synchronization signal occurs. In a fourth period from time T30 to time T31 a number of pulses at the rate of the horizontal synchronization signal occur. Conventional detectors for vertical synchronization seek to detect this repeating four period pattern by frequency detection and filtering methods.

In a display of the present invention, vertical synchronization is established and maintained by sampling signal COMP at a recurring time spaced equally from assertions of signal SYNC, for example, as shown in FIG. 2 at times T7 and T14. Samples at four such times TS1 through TS4 are shown in FIG. 3. At times TS1, TS2, and TS3, the sampled amplitude is a "low" value, while at time TS4, the sampled value is "high."

The cooperation of the first shift circuit in column selector 46, the second shift circuit in row selector 60 and row selector initialization detector 68 is now apparent by comparison of FIGS. 1 and 3. Column pointer signal CPA on line 72 conveys sampled values at a recurring time spaced from signal SYNC by virtue of being provided at a predetermined shift bit position in a shift circuit clocked by signal P_CLK; P_CLK being phase locked to the period of signal SYNC. Consecutive samples are stored in the second shift circuit and provided to row selector initialization logic 68 as signal group 62. Row selector initialization logic detects three "low" samples taken at times TS1 through TS3 and conveyed by row pointer signals RP0 through RP2 on lines in group 62 followed by a "high" sample taken at time TS4 and conveyed by column pointer signal CPA on line 72 to establish and maintain the walking-one pattern in row selector 60. Although one skilled in the art will appreciate the variety of logic circuits available to implement this function of row selector initialization logic 68, see FIG. 7 for a preferred embodiment.

Although a composite signal conforming to NTSC standards has been used in the illustrated embodiment, one of ordinary skill will recognize that the conditions sufficient for establishing a walking-one pattern in row selector 60 depend on the format of the composite signal. The embodiment shown operates properly in a generalized signal format when vertical synchronization is conveyed by a recurring pulse for example at times T22, T23, T25, etc. and a characteristic value in each period between such pulses, for example a "low" at time TS1 in the period from time T23 to T25 and a "high" in the period between times T26 and T28. Note that the step of detecting a double frequency signal as for an NTSC format is replaced with the step of detecting a value in a recurring period, regardless of other signal levels or pulses occurring in that period. Greater accuracy and reliability of establishing and maintaining vertical synchronization is accomplished by the present invention in part by sampling at a time spaced from the horizontal synchronization signal, as opposed to conventional frequency detecting schemes.

FIG. 4 is a schematic diagram of a portion of the column selector 46 shown in FIG. 1. In the portion shown, clock phase generator 312 cooperates with all shift stages of which shift stages 350 and 352 are representative. Transistors Q30 through Q46 form shift stage 350 at the first shift bit position and generate pointer signal CP0 on line 330. Based on signal P_CLK on line 310, clock phase generator 312 generates two non-overlapping clock phase signals, PHASE1 and PHASE2, on lines 314 and 316 using conventional timing and logic circuits. Because shift circuit 43 shifts on every edge of signal P_CLK, the need for a signal of twice the frequency of signal P_CLK is eliminated. Operation of shift stage 350 is best understood with reference to a timing diagram. All stages in shift circuit 43, in the preferred embodiment, are identical to shift stage 350, shown in FIG. 4.

Figure 5:
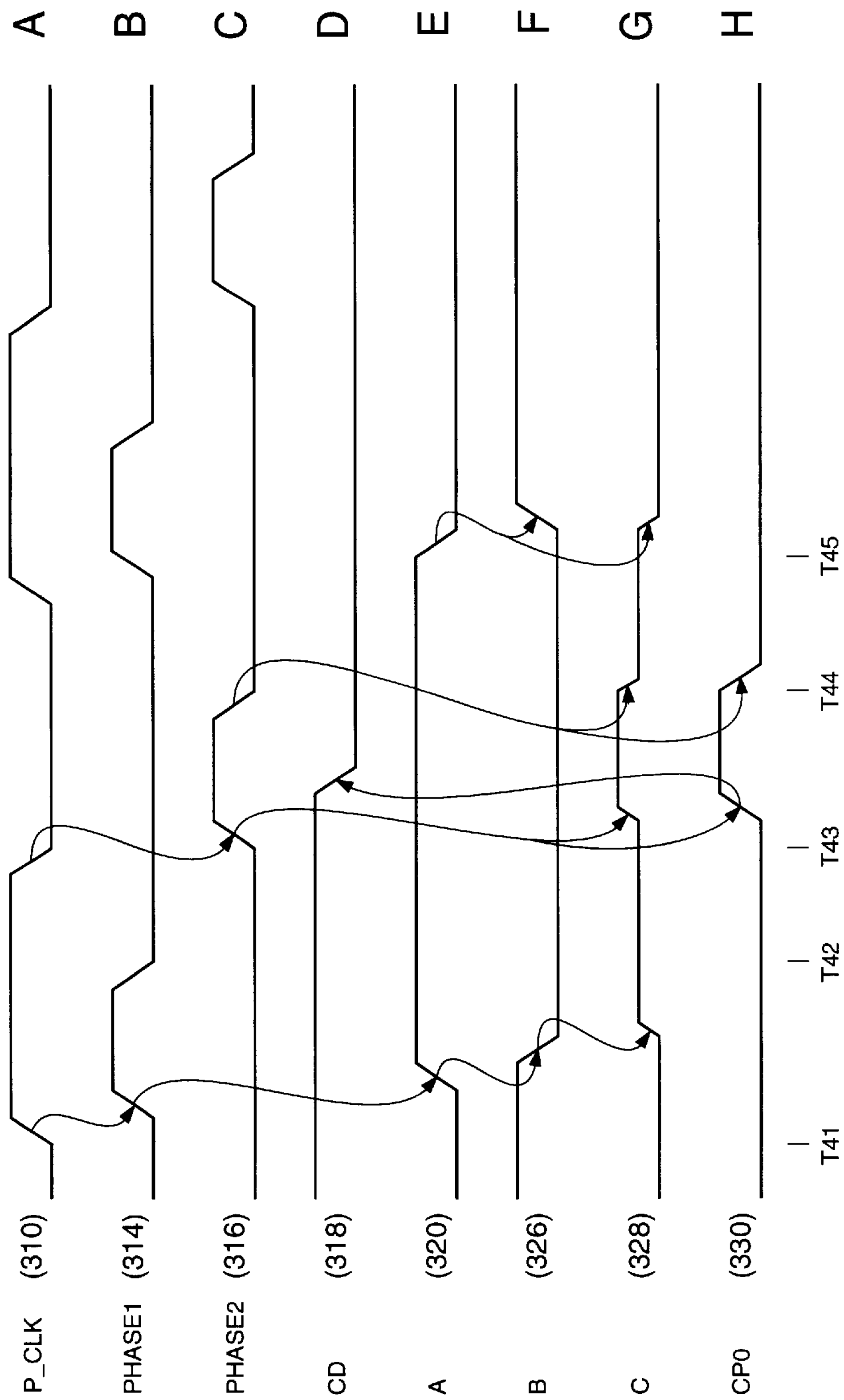
FIG. 5 is a timing diagram of signals shown in FIG. 4.

FIG. 5 is a timing diagram of signals shown in FIG. 4 illustrating several aspects of the operation of shift stage 350 of shift circuit 43 shown in FIG. 4. In summary, from time T41 to time T43 stage 350 toggles from "low" to "high" in response to a "high" signal CD on line 318. Consequently, stage 350 asserts column pointer signal CP0 on line 330 "high." From time T43 to time T45, a "low" on signal CD on line 318 toggles stage 350 so that column pointer signal CP0 on line 330 is not asserted.

Assuming for the sake of description that stage 350 was providing a "low" on column pointer signal CP0 prior to time T41, at time T41 the rising edge of signal P_CLK on line 310 causes transistors Q30 and Q32 to conduct, signal A on line 320 to go "high," transistor Q40 to conduct, transistor Q42 to stop conducting, and signal C on line 328 to go "high." After a delay prescribed by clock phase generator 312, signal PHASE1 goes "low" isolating stage 350 from further changes or noise on line 318. Then, in response to the falling edge of signal P_CLK, signal PHASE2 on line 316 goes "high," transistor Q46, in cooperation with an intrinsic capacitance between lines 328 and 330, "boots" and provides signal CP0 on line 330 at or near the $V_{cc}$ power supply potential.

Stage 350 is coupled to the next stage 352 by data line 320 and clock lines 314 and 316. By reversing lines 314 and 316 into next stage 352, operations in stage 350 just after time T41 are performed in next stage 352 just after time T43. Therefore, when signal PHASE2 on line 316 goes "low" so that transistor Q46 no longer supplies current to line 330, there is no adverse effect in next stage 352, since next stage 352 has already seized data from line 330 and will soon enter the isolated state.

Stage 350 draws minimal current when identifying signal CP0 is "low" and little additional current when a "low" bit is shifted through stage 350. Stage 350 draws a nominal current through transistors Q34 through Q38 when signal A on line 320 is "high." However, since shift circuit 43 in cooperation with logic circuit 48 shifts a walking-one pattern, column pointer signal CP0 is predominantly "low" resulting in remarkably low power dissipation in shift circuit 43.

In a preferred embodiment of the circuit shown in FIG. 4, transistor Q42 is designed to provide weak drive capability. This capability is realized by conventional techniques including making the channel of Q42 for example four times longer than the nominal channel length used for the remaining transistors shown in FIG. 4. Other performance advantages are realized by (1) arranging transistors Q36 and Q38 to provide significant capacitance for "booting" transistor Q42, (2) arranging parasitic capacitances at line 320 to ground and between lines 328 and 330 for improved switching operation, and (3) arranging a favorable capacitive divider at node C. The latter is accomplished in a preferred embodiment by making transistor Q46 about 3 times larger than transistor Q32 and by using conventional layout techniques to assure that the capacitance between lines 314 and 328 is about ten times smaller than all other capacitance on node C.

In a preferred embodiment, the circuitry of row selector 60 is substantially identical to that described above for column selector 46. In such an embodiment, row selector 60 includes a second shift circuit and an enhanced clock phase generator. The second shift circuit is identical in structure and operation as shift circuit 43, except that the second shift circuit has more or fewer shift bit positions than shift circuit 43 in column selector 46 depending, for example, on the aspect ratio of display 10 and the format of signal COMP. The enhanced clock phase generator is identical in structure and operation as clock phase generator 312, except that the enhanced clock phase generator includes a clock frequency divider. In one embodiment, such a divider is a conventional flip flop that toggles on each edge of input clock signal R_CLK. Therefore, shifting in the second shift circuit occurs on every edge of input clock signal R_CLK so that skipping of rows is avoided.

Two additional beneficial aspects are obtained by clock frequency division. First, the highest frequency signal employed in display 10 has a frequency of one half the column to column pixel scanning rate. Among other advantages, lower power, lower noise generation, and greater noise immunity result. Second, division provides a 50% duty cycle waveform on line 310, similar to the 50% duty cycle waveform conventionally provided by VFO 42. A 50% duty cycle simplifies clock phase generation. Among other advantages, wider operating temperature range, increased vertical synchronization accuracy, and longer reliable operation under battery power result.

Figure 6:
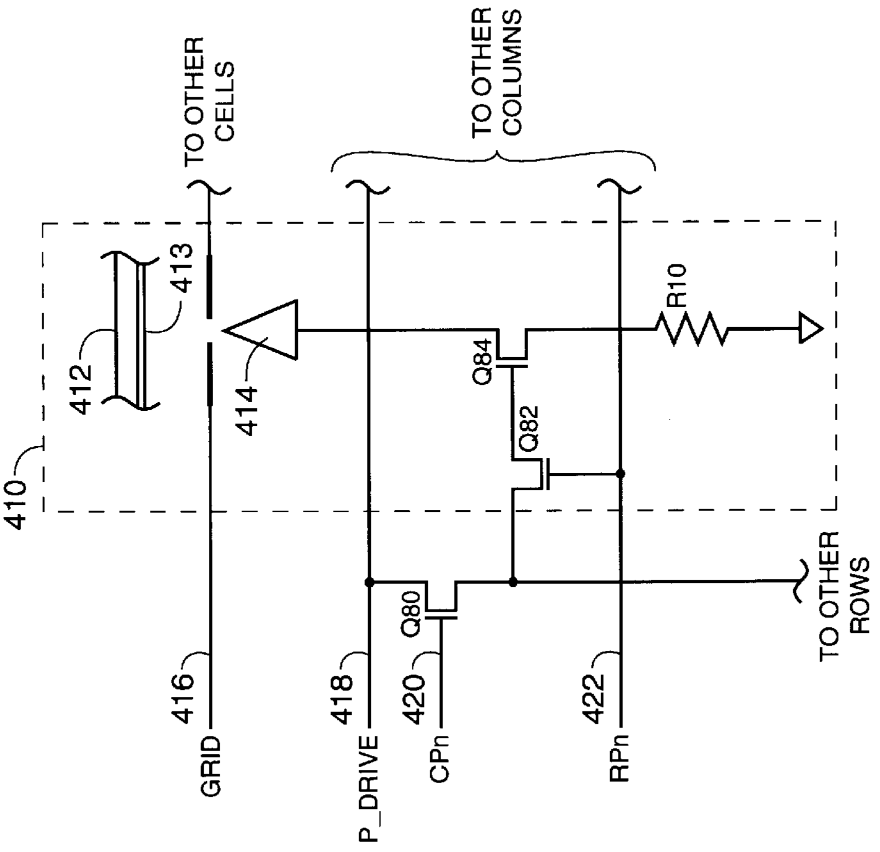
FIG. 6 is a schematic diagram of a portion of the transfer gates and the matrix of display cells shown in FIG. 1.

FIG. 6 is a schematic diagram of a portion of the transfer gates and the matrix of display cells shown in FIG. 1. Display 10 in a preferred embodiment is a flat panel display of the type conventionally referred to as a field emission display. Display 10 includes a phosphorescent target aligned adjacent to matrix 22. Although not shown in FIG. 1, a portion of this target is aligned adjacent to a field emission tip 414 in each display cell 410 as shown in FIG. 6. Target 412 is conated by conventional methods with at least one of several conventional phosphorescent substances, shown generally as coating 413.

Grid conductor 416, tip 414, transistor Q84, and resistor R10 cooperate for enabling field emission by tip 414. Emission of electrons from tip 414 is excited and controlled by signal GRID on conductor 416. Conductor 416 has a shape of the type conventionally employed for promoting reliable, focussed emission, thereby defining a matrix of picture elements ("pixels") on the target. The continuous DC voltage of signal GRID is provided by power supply 16 with signals 18 shown in FIG. 1. In alternate embodiments, signal GRID is switched to employ varying or alternating voltages. Transistor Q84 conducts current for field emission through resistor R10. Although R10 operates as a simple current source for the illustrated embodiment, in alternate and equivalent embodiments, more sophisticated current sources using conventional circuitry are employed.

Transistors Q80 and Q82 cooperate for access to display cell 410. A column pointer signal CPn on line 420 of the type shown in group 54 in FIG. 1 identifies for display all display cells of one column in matrix 22. A row pointer signal RPn on line 422 of the type shown in group 64 in FIG. 1 identifies for display all display cells of one row in matrix 22.

In one embodiment, one display cell operates at the intersection of each row and each column in matrix 22 so that signals CPn and RPn cooperate to identify one display cell for displaying a pixel brightness concurrently conveyed by signal P_DRIVE on line 418. In alternate and equivalent embodiments, each display cell includes a plurality of tips per access transistor Q84. In another alternate and equivalent embodiment, more than one display cell operate at each intersection.

Transfer gates 21 include one transistor for each column. One of such transistors is shown in FIG. 6 as transistor Q80. As a transfer gate, transistor Q80 operates to transfer a pixel brightness level from signal P_DRIVE to a column identified by a column pointer signal. In alternate and equivalent embodiments, more sophisticated transfer gate circuits of conventional configurations are employed in place of transistor Q80.

Figure 7:
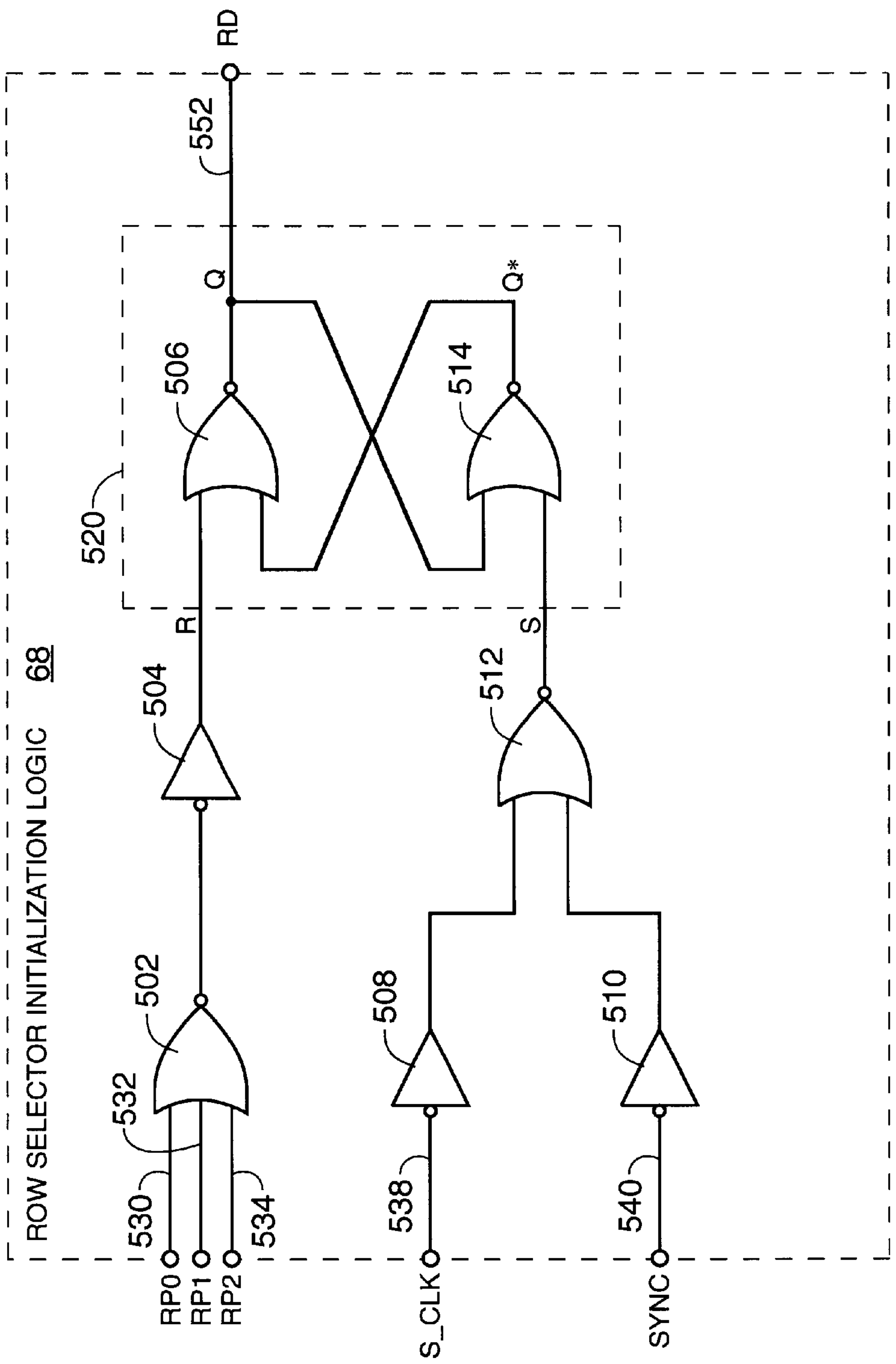
FIG. 7 is a schematic diagram of a portion of row selector initialization logic shown in FIG. 1.

FIG. 7 is a schematic diagram of a portion of row selector initialization logic shown in FIG. 1. Row selector initialization logic 68 includes an OR-gate formed by gate 502 and inverter 504; an AND-gate formed by inverters 508 and 510 with gate 512; and flip flop 520 formed by gates 506 and 514. These logic elements cooperate to establish and maintain a walking-one pattern in row selector 60. When signal RD is asserted, a "one" is clocked into row selector 60, thereby establishing the walking-one pattern. When signal RD is not asserted, a "zero" is clocked into row selector 60, thereby maintaining the walking-one pattern until the next occurrence of the vertical synchronization periods of the SYNC signal.

In operation flip flop 520 is set, thereby asserting signal RD on line 552, when signal SYNC is sampled "high" on line 540 when signal CPA on line 538 is asserted "high," for example at time TS4 as shown in FIG. 3. When signal RD is "high" and row selector 60 is clocked by column pointer signal CPF, a "one" is clocked into the first shift bit position of the second shift circuit in row selector 60. Flip flop 520 is reset, thereby removing signal RD from line 552, when any one or more of row pointer signals RP0, RP1, and RP2 is "high." Therefore, as soon as one "one" is clocked into the first shift bit position, row pointer signal RP0 on line 530 is asserted "high" and signal RD on line 552 is removed to establish a walking pattern having all "zero" states except one "one" state.

The additional inputs on lines 532 and 534 perform two functions. First, these inputs assure that at least three "low" samples are received before a "high" sample sets flip flop 520. Second, these inputs assure that subsequent samples, for example at time TS5 in FIG. 3, do not initiate a duplicate subsequent "one" in the row shift pattern.

The present invention may be practiced according to a method for synchronizing a display to an input signal. The input signal includes three groups of periods. Such an input signal is of the type shown in FIGS. 2 and 3 as signal COMP. As illustrated for signal COMP, each period is of the same duration, for example, from T1 to T9 in FIG. 2. In FIG. 3, the first group of periods corresponds to all periods except periods included between times T23 and T31. The second group of periods corresponds to periods between times T23 and T26. The third group of periods corresponds to periods between times T26 and T29. Note that each period includes a pulse. Pulses in signal SYNC are aligned with such pulses in signal COMP.

The input signal during each period includes a respective value. For signal COMP, such values of the first group are illustrated in FIG. 2 at recurring times T7, T14, and etc. These values are within a range of magnitudes such as the range between amplitudes V8 and V9 shown in FIG. 3. For signal COMP, such values of the second group are illustrated in FIG. 3 at times TS1 through TS3 and those of the third group at times TS4 and TS5. Values in the second and third groups of periods are outside the range of magnitudes V8 to V9, though the typical magnitude for the second group differs from the typical magnitude for the third group.

The method in one embodiment includes the steps of (1) determining for each period a first respective time when the respective pulse is expected to begin and identifying a second respective time; (2) determining a third time when the second plurality of periods is expected to begin; (3) establishing the start time; and (4) repeating the three foregoing steps, thereby maintaining synchronization. Several embodiments of this method are discussed below to illustrate various ways of performing these steps.

In a first embodiment, the first step is accomplished by shifting, responsive to a clock signal, a first bit in a first shift circuit. The first shift circuit includes a first output asserted to identify the first respective time in each period and a second output asserted to identify a second respective time during each period. The second time is prior to the first time. The first output is coupled to a phase locked loop. The phase locked loop provides the clock signal in response to the first output and the input signal. The clock signal is characterized by the duration.

In another embodiment that builds on the first, the second step is accomplished by counting respective pulses of the first plurality of periods from a start time. Counting is performed by shifting a second bit in a second shift circuit, shifting being in response to the first output. The second shift circuit includes a third plurality of outputs and a fourth plurality of outputs. Each output of the third plurality is asserted prior to assertion of any output of the fourth plurality.

In another embodiment that builds on the second, The third step is accomplished by sampling the input signal at the second respective time in each period until a first number of samples each equal in magnitude to the first value and another sample equal in magnitude to the second value have been detected. The first number is equal to the third plurality.

According to a first aspect of these methods, the loop is locked by operation of the first shift circuit so that the timing relationship between outputs of the several stages of the first shift circuit are reliably maintained. In addition, no additional circuitry, such as a conventional binary decoder, is needed to sample the input signal at a particular time.

According to another aspect, several samples of the input signal are stored in order in the second shift circuit so that false detection of vertical synchronization is prevented.

According to another aspect, the outputs of the several stages of the second shift circuit are available for disabling the loop comparator which may be desirable, for example, during the vertical retrace time of an NTSC video signal.

In some applications composite signals are to be stored, for example, to enhance communications network traffic management, to process measurements in a telemetry system, or to delay video signals for analysis or special display effects. These conventional systems employ conventional memory cells addressed in a matrix analogous to addressing display cells discussed at length above.

As one example of such a system enhanced with a timing control of the present invention, consider a video frame buffer that includes a timing control for scanning a matrixed memory array. The frame buffer is similar to the display embodiments, except that a matrix of memory cells is employed in place of the matrix of display cells. Each memory cell stores samples taken from the composite signal at a predetermined time after a recurring synchronization signal is received. The timing control includes means for reading the memory cells and means for outputting values read from memory. Such reading means and outputting means use conventional circuitry and conform to conventional addressing and output signal characteristics. In one embodiment, samples from the composite signal are digitized and stored in a dynamic random access memory. In another embodiment samples are stored in a charge coupled device and the means for outputting responds to a synchronization signal for digitizing the stored values so that a serial stream of digital values is synchronously provided.

The foregoing description discusses preferred embodiments of the present invention, which may be changed or modified without departing from the scope of the present invention.

For example, P-channel FETs may be replaced with N-channel FETs (and vice versa) in some applications with appropriate polarity changes in controlling signals as required. Moreover, the P-channel and N-channel FETs discussed above generally represent active devices which may be replaced with bipolar or other technology active devices.

Still further, those skilled in the art will understand that the logical elements described above may be formed using a wide variety of logical gates employing any polarity of input or output signals and that the logical values described above may be implemented using different voltage polarities. As an example, an AND element may be formed using an AND-gate or a NAND-gate when all input signals exhibit a positive logic convention or it may be formed using an OR-gate or a NOR-gate when all input signals exhibit a negative logic convention.

These and other changes and modifications are intended to be included within the scope of the present invention.

While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent in light of the disclosure to one of ordinary skill in the art to which the invention applies.

The words and phrases used in the claims are intended to be broadly construed. A "system" refers generally to electrical apparatus and includes but is not limited to a packaged integrated circuit, an unpackaged integrated circuit, a combination of packaged or unpackaged integrated circuits or both, a microprocessor, a microcontroller, a memory, a register, a flip-flop, a charge-coupled device, combinations thereof, and equivalents.

A "signal" refers to mechanical and/or electromagnetic energy conveying information. When elements are coupled, a signal is conveyed in any manner feasible with regard to the nature of the coupling. For example, if several electrical conductors couple two elements, then the relevant signal comprises the energy on one, some, or all conductors at a given time or time period. When a physical property of a signal has a quantitative measure and the property is used by design to control or communicate information, then the signal is said to be characterized by having a "value." The amplitude may be instantaneous or an average. For a binary (digital) signal, the two characteristic values are called logic levels, "high" or "one" and "low" or "zero."

A "clock" signal includes any recurrent signal having a predefined timing relationship to other signals. The term "clock" signal includes for example, shift signals, column pointer signals, and row pointer signals because such signals recur and maintain a timing relationship related to respective shift bit positions.

What is claimed is:

1. A circuit for producing a walking one pattern in a shift register, comprising:

a shift register having a data input and a plurality of consecutive shift register stages, wherein each of said shift register stages has a data output; and a NOR gate having an output and a plurality of inputs, wherein the NOR gate output is connected to the data input of the shift register, and the data output of each of said shift register stages is connected to a respective one of the NOR gate inputs.

2. A circuit according to claim 1, further comprising:

a clock for producing a periodic clock signal;

wherein the shift register further comprises a clock input connected to receive the clock signal.

3. A method of producing a walking one pattern in a shift register, comprising the steps of:

providing a shift register having a data input and a plurality of consecutive shift register stages, wherein each of said shift register stages has a data output;

producing a signal having a value which is the logical NOR of the respective data outputs of all of said shift register stages; and coupling the logical NOR signal to the data input of the shift register.

4. A method according to claim a 3, further comprising the step of:

clocking the shift register so that data progressively shifts from each stage to the next successive stage.

5. A circuit for producing a walking one pattern in a shift register, comprising:

a shift register having a data input and a plurality of consecutive shift register stages, wherein each of said shift register stages has a data output; and a NOR gate having an output and a plurality of inputs, wherein the NOR gate output is connected to the data input of the shift register, and the data output of each of said consecutive shift register stages is connected to a respective one of the NOR gate inputs.

6. A circuit according to claim 5, further comprising:

a clock for producing a periodic clock signal;

wherein the shift register further comprises a clock input connected to receive the clock signal.

* * * * *